US010639765B2

(12) United States Patent
Piraube et al.

(10) Patent No.: US 10,639,765 B2
(45) Date of Patent: May 5, 2020

(54) SYSTEM AND METHOD FOR COMPENSATING DEVIATIONS IN AN OPTICAL LENS MANUFACTURING PROCESS

(71) Applicant: Essilor International, Charenton-le-Pont (FR)

(72) Inventors: Sebastien Piraube, Dallas, TX (US); Brad J. Gelb, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/570,715

(22) PCT Filed: May 29, 2015

(86) PCT No.: PCT/IB2015/001052
§ 371 (c)(1),
(2) Date: Oct. 30, 2017

(87) PCT Pub. No.: WO2016/193771
PCT Pub. Date: Dec. 8, 2016

(65) Prior Publication Data
US 2018/0290257 A1    Oct. 11, 2018

(51) Int. Cl.
*B24B 13/06*    (2006.01)
*G05B 19/404*    (2006.01)
(Continued)

(52) U.S. Cl.
CPC .............. *B24B 13/06* (2013.01); *B24B 13/00* (2013.01); *B29D 11/00* (2013.01);
(Continued)

(58) Field of Classification Search
None
See application file for complete search history.

(56) References Cited

U.S. PATENT DOCUMENTS

2005/0157254 A1*    7/2005    Shinohara ............ G02C 7/061
                                                                 351/158
2007/0153271 A1    7/2007    Chang et al.
(Continued)

FOREIGN PATENT DOCUMENTS

| CN | 103940377 A | 7/2014 |
| EP | 2645193 A1 | 10/2013 |
| WO | 2014084247 A1 | 6/2014 |

OTHER PUBLICATIONS

"Custom Lens Design Solution", Satisloh, Crossbows Optical Unlimited, Feb. 2013. (Year: 2013).*
(Continued)

*Primary Examiner* — Carlos R Ortiz Rodriguez
(74) *Attorney, Agent, or Firm* — Oblon, McClelland, Maier & Neustadt, L.L.P.

(57) ABSTRACT

A real-time calculation system capable of computing the industrial optical performance and yields of a prescription laboratory is disclosed. The system uses statistical analysis to determine the compensation factors that can be applied to given products, Semi-Finish, materials, or lens designs to increase the lab yields. Using a monitoring and configuration system, the user tracks the evolution of the laboratory's performance and identifies areas in which yields are impacted. The user defines how the calculation system will optimize the laboratory's performance, such as by defining how the compensation factors will be calculated and applied.

15 Claims, 7 Drawing Sheets

(51) Int. Cl.
*G05B 19/418* (2006.01)
*B29D 11/00* (2006.01)
*B24B 13/00* (2006.01)

(52) U.S. Cl.
CPC .. *B29D 11/00423* (2013.01); *B29D 11/00951* (2013.01); *G05B 19/404* (2013.01); *G05B 19/41875* (2013.01); *G05B 2219/45157* (2013.01); *Y02P 90/22* (2015.11); *Y02P 90/265* (2015.11)

(56) References Cited

U.S. PATENT DOCUMENTS

2013/0236262 A1 9/2013 Hon
2014/0368790 A1 12/2014 Drobe et al.

OTHER PUBLICATIONS

ISR/WO for International Application No. PCT/IB2015/001052; dated Feb. 16, 2016.

\* cited by examiner

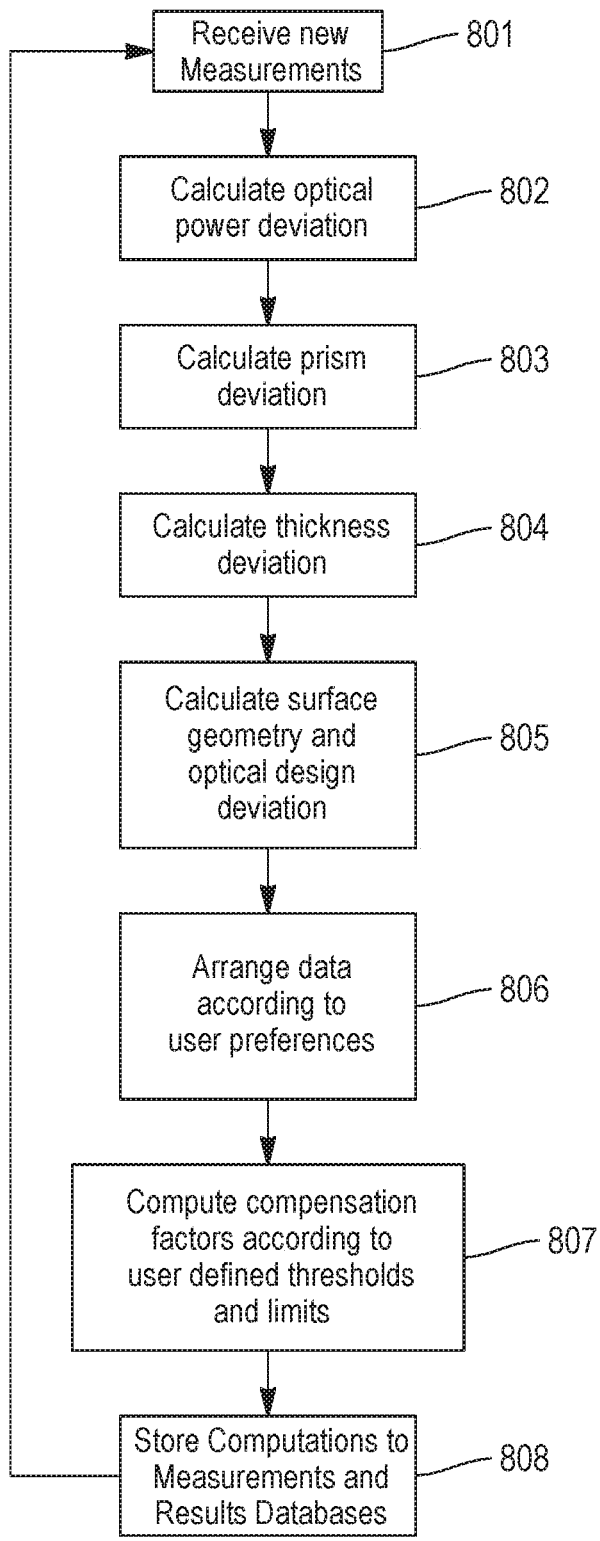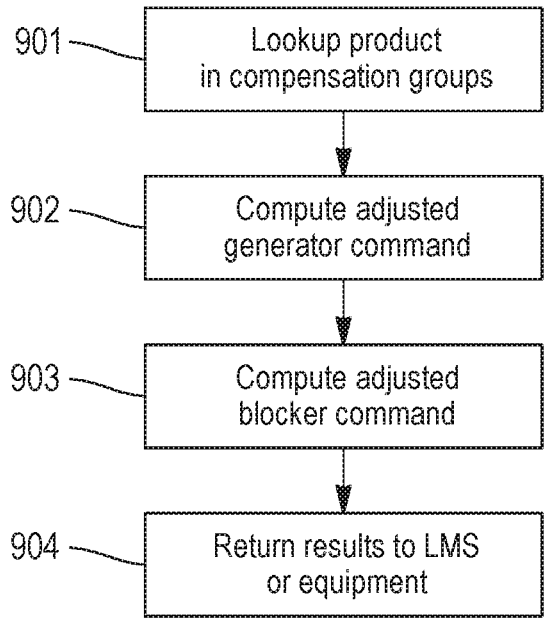
FIG. 8
FIG. 9 though the difference between the prescription optical power and the achieved power is outside of predetermined tolerances, the lens is scrapped, thereby reducing the optical prescription laboratory's industrial yields.

SYSTEM AND METHOD FOR COMPENSATING DEVIATIONS IN AN OPTICAL LENS MANUFACTURING PROCESS

BACKGROUND

The role of optical prescription laboratories is to deliver lenses to professional customers, such as opticians, independent optometrists, wholesalers and optical chain stores, as quickly as possible. Optical prescription laboratories must produce lenses having the power prescribed in a received order within a certain tolerance. The Semi-Finished (SF) lens blanks used to produce prescription lenses in prescription laboratories have a given front side design that is manufactured under certain tolerances. Due to deviations in the surfacing process in the prescription laboratories, the optical power and optical design achieved by surfacing lenses is not always perfectly on target. When the difference between the prescription optical power and the achieved power is outside of predetermined tolerances, the lens is scrapped, thereby reducing the optical prescription laboratory's industrial yields.

Presently, statistical analysis is performed manually by process engineers in optical prescription laboratories to determine the distribution of lens power deviations between the nominal optical powers and the achieved optical powers. The objective of this analysis is to try to determine whether there is a consistent shift in the optical deviations for which a compensation may be applied to increase the optical prescription laboratory's yields. Using this statistical analysis, the process engineer may determine the average deviation and then statically define compensations to be applied in a Lens Design System (LDS) or optical calculator.

As for design measurements, no systematic per lens design analysis is currently performed in prescription laboratories. This manual work is therefore limited to far vision optical power deviations and is very cumbersome as it requires a good understanding of optical product industrial performances and statistical analysis. It is also limited to the LDS calculators for which the prescription laboratory is able to access the configuration system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments disclosed herein define a real-time calculation system or analyzer capable of computing the industrial optical performance and yields of a prescription laboratory. The system uses statistical analysis to determine the compensation factors that can be applied to given products, Semi-Finish, materials, or lens designs to increase the lab yields. Using a monitoring and configuration system, the user, such as a lab manager, engineer, etc., tracks the evolution of the laboratory's performance and may identify areas in which yields are impacted. The user may also define how the calculation system will optimize the laboratory's performance, such as by defining how the compensation factors will be calculated and applied.

As a result, the optimization of a prescription laboratory's performance is accomplished in real-time and across multiple LDS. Monitoring and control are therefore centralized for all products ran in the laboratory. The laboratory may also use the system to monitor changes in its performance over time and thereby detect any surfacing process deviation trends.

Embodiments disclosed herein provide an integrated solution that can be implemented in an optical prescription laboratory to optimize its industrial performance and thereby increase its yields. Examples of the improvements and benefits provided by this system include:

real-time detailed and customizable statistical analysis of the Rx Lab's performance, such as yields, optics deviation, comparison of different production lines, etc., and monitoring capability for the user;

real-time compensation of the surfacing equipment or the LDS commands to optimize the Rx Lab's industrial performance;

real-time improvement of production yields in terms of optics;

system integration with any LDS optical calculator used in the Rx Lab and the capability to compensate across all optical calculators used in production;

reduced time-to-market for new products by removing the need for the new product development processes before installation in the production environment; and removal of the need for manual statistical analysis and static compensation of optics within LDS calculators.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 8 is a flowchart illustrating a method for continuously computing statistical performance of an optical prescription laboratory;

FIG. 9 is a flowchart illustrating a method for compensating for a given prescription by the LMS.

DETAILED DESCRIPTION

The systems and methods described herein take optical and front- and/or back-surface measurements performed in an optical prescription laboratory (Rx Lab) during production as an input. Embodiments use a configuration database and a statistical analysis database as well as the observed statistical analysis of the Rx Lab's performance over time to determine compensation factors to be applied to future production runs. This solution optimizes the Rx Lab's performance in real-time and across multiple LDS. Monitoring and control are centralized for all products used in the Rx Lab. The Rx Lab may also use the system to monitor the evolution of its performance over time and thereby detect any deviation trends in the surfacing process.

Figure 1:
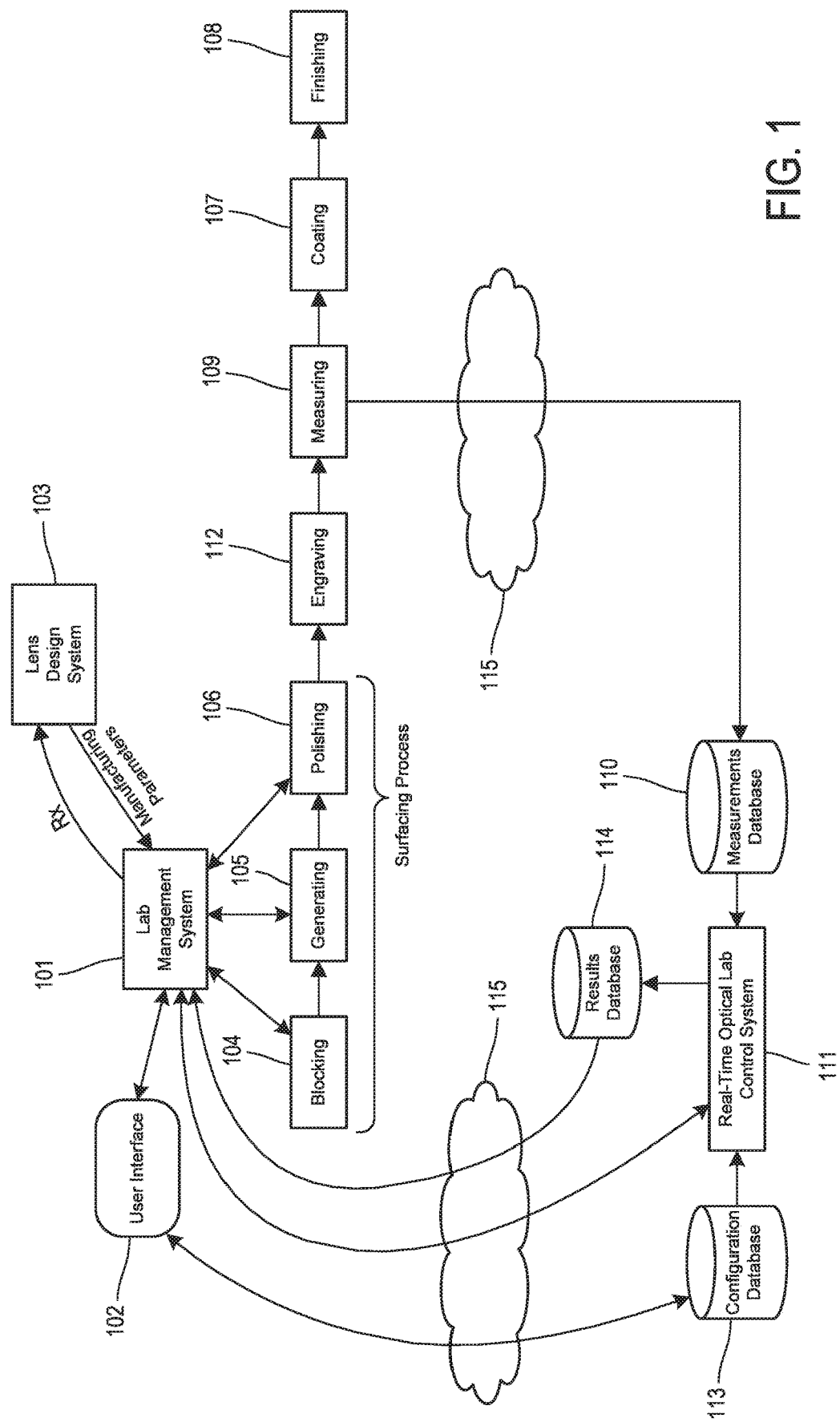
FIG. 1 is a high-level block diagram illustrating control of components in an optical prescription laboratory by a Lab Management System (LMS)

FIG. 1 is a high-level block diagram illustrating control of components in an optical prescription laboratory by a Lab Management System (LMS) 101. A user provides a lens prescription to LMS 101 via user interface 102. The LMS 101 sends the prescription to a calculator in LDS 103, which calculates and returns manufacturing parameters for the LMS 101. LDS 103 is selected based upon the lens design optics that are being manufactured and is specific to a selected lens design brand.

LMS 101 uses the manufacturing parameters to command the surfacing process equipment in the optical prescription laboratory, such as a blocker, generator, and polisher, to create a lens having the desired optics defined by the prescription. Blocking 104 uses reference markings on a lens blank to position the lens blank for attachment to a lens block. Generating process 105 may grind or cut a lens in any number of well-known ways without limitation. For example, in a single vision (SV) lens, generating 105 cuts the back surface of the lens to set a desired lens power and cuts the desired shape of the lens blank. Generating 105 may also grind a complex back surface on a SV Semi-Finished (SF) lens blank. In other embodiments for more complex lens designs, generating 105 may cut both the front and back surfaces of the lens blank. Polishing 106 polishes the cut lens blank. The lens may undergo further coating 107 and finishing 108 processes. It will be understood that the compensations described and applied herein can be applied to any lens processing without regard to the complexity of the design or the number of surfaces being cut.

The design parameters of the cut and polished lenses are measured 109 to monitor and control the laboratory processes. Measuring 109 may include, for example, measuring optical parameters, such as power and prism, using a focimeter, measuring lens thickness using a thickness gauge, and measuring lens design using a lens mapper. Measuring 109 is performed continuously for each lens being manufactured. The measurements may be taken manually or automatically depending upon the type of equipment available in the laboratory. The measurements may be stored to measurements database 110 or provided directly to an analyzer, such as real-time optical lab control system 111. In engraving step 112, a laser engraves the back of the lens with semi-visible markings that are used to position the lens for measuring and to identify where the optical design is located.

Real-time optical lab control system 111 receives inputs from measurement database 110, configuration database 113, LMS 101, and/or other sources. These inputs are processed to compute deviations between the prescription parameters and the parameters of the lens actually manufactured. The deviations may be the result of wear over time in the lens surfacing equipment itself or in consumables used by the equipment. For example, wear or age of consumables, such as polishing pads and cutting tips, may introduce deviations in how the surfacing equipment operates over time. Deviations may differ based upon the amount of wear, the brand of equipment, and/or the brand or type of consumable used.

These deviations may then be used to compute compensation factors to be applied to the laboratory equipment, such as the blocker, generator, and polisher, by the LMS 101 to bring the actual lens parameters closer to the prescription parameters. The results of the analysis may be provided directly LMS 101 or stored to a results database 114 that the LMS 101 may access as required. The data generated by real-time optical lab control system 111 may be grouped by any appropriate parameter, such as by lens material, design, product group, etc. It will be understood that measurement database 110, configuration database 113, and results database 114 may be stored separately in different memory components. Alternatively, two or more of the databases may be stored in the same memory component. The memory components may be part of LMS 101, real-time optical lab control system 111, or any other component.

Figure 2:
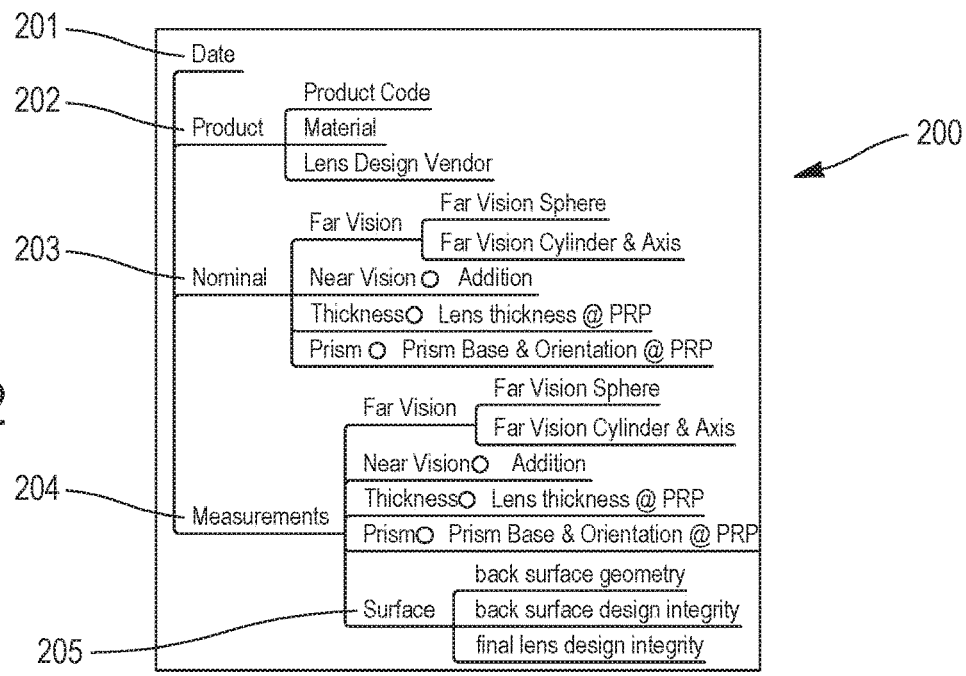
FIG. 2 illustrates an example organization of the contents of information stored to measurements database.

FIG. 2 illustrates an example organization of the contents of information stored to measurements database 110. A set of measurements 200 for each lens may include the following components. Date 201 represents that the lens was manufactured and when the measurements were taken. Product information 202 may include a product code and identify the material used and the lens design vendor. Nominal prescription information 203 may be included, such as far vision, near vision, thickness, and prism parameters. Measurement data 204 includes the measurements of the lens that was actually produced, including, for example, far vision, near vision, thickness, and prism measurements. Measurement data 204 may further include surface geometry measurements 205. It will be understood that measurements 200 are intended to be representative examples and that any appropriate measurements of the production lens may be detected and stored.

Figure 3:
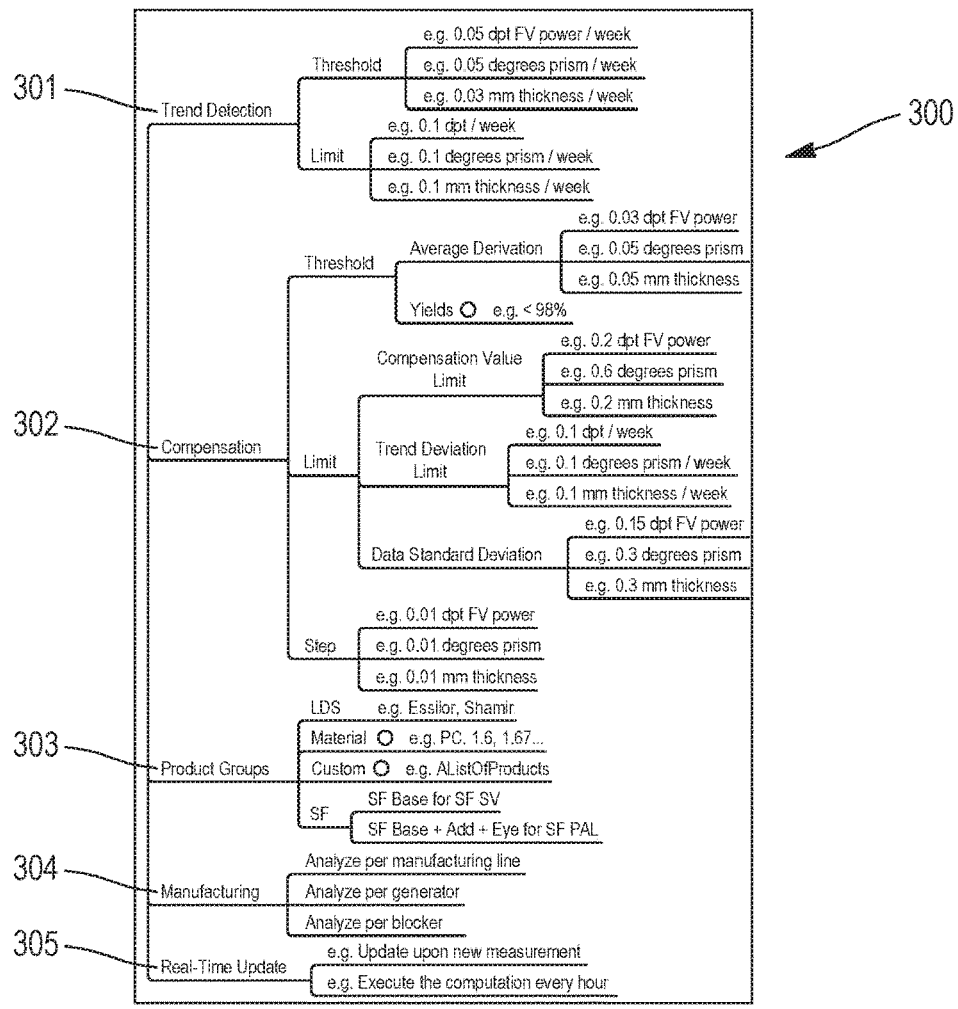
FIG. 3 illustrates example contents of information stored to configuration database.

FIG. 3 illustrates example contents of information 300 stored to configuration database 113. Information 300 provides parameters that direct how real-time optical lab control system 111 will handle data. Trend detection parameters 301 identify, for example, threshold values and limits for detecting changes in power, prism, and thickness. Compensation parameters 302 identify threshold values and limits to the compensation to be applied and step size for the compensation applied for power, prism, and thickness deviations. Product groups 303 identify how real-time optical lab control system 111 should group data based upon, for example, the LDS or material used, any custom grouping, or the SF base of single vision (SV) or progressive addition lenses (PAL).

Configuration data 300 may also identify manufacturing parameters 304 to group analyses by manufacturing line or by component, for example. Real-time update data 305 directs how often the real-time optical lab control system 111 should provide updates, such as with each measurement, hourly, or other parameter. It will be understood that parameters 300 are intended to be representative examples and that any appropriate analyzer parameters may be provided to the real-time optical lab control system 111.

Figure 4:
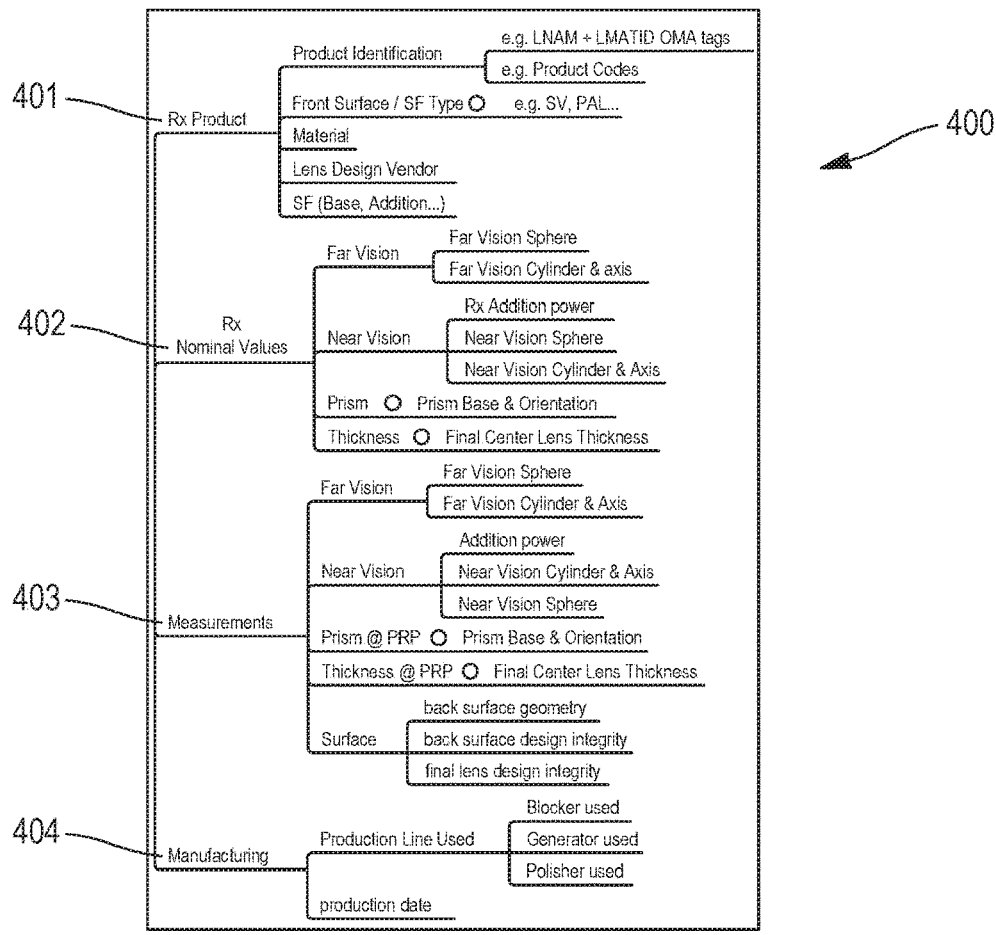
FIG. 4 illustrates example input data that may be provided to an analyzer to detect deviations in a lens manufacturing process.

FIG. 4 illustrates example input data 400 that may be provided to a real-time optical lab control system 111 to detect deviations in a lens manufacturing process. Input data 400 may include product data 401 for the lens blank that is used to fill the optical prescription. Product data 401 may include product identification information, such as a lens style name (LNAM) or a material number (LMATID). The contents input data 400 and product data 401 may be defined and/or formatted according to industry standards, such as the Data Communication Standard developed by The Vision Council, a trade association for manufacturers and suppliers in the optical industry.

Input data 400 includes nominal values 402 for the prescription for a particular lens to be manufactured. The measurements 403 for the actual manufactured lens are also included in the input data 400. Manufacturing data 404 may be included, such as the types of components used in the laboratory and the production date.

Input data 400 may be provided to real-time optical lab control system 111 from a single source, such as LMS 101. Alternatively, real-time optical lab control system 111 may collect input data 400 from two or more sources independently, such as from measurements database 110 and configuration database 113 as well as LMS 101. It will be understood that input data 400 is intended to as a representative example and that any appropriate parameters may be provided to the real-time optical lab control system 111.

Figure 5:
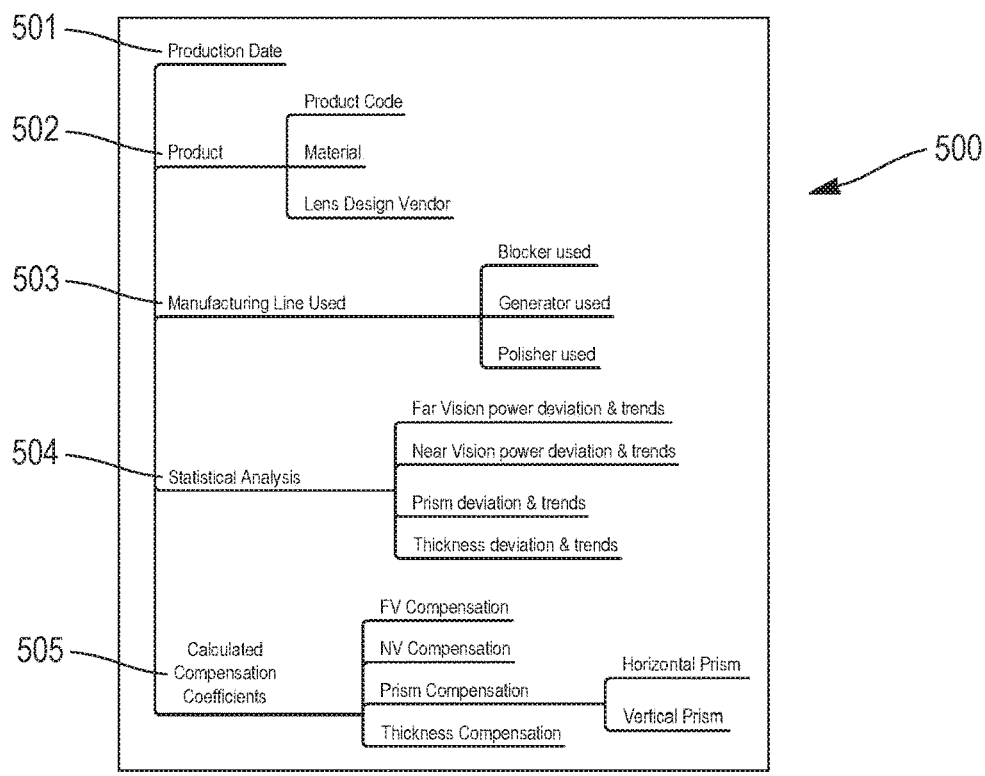
FIG. 5 illustrates example output data from an analyzer, which may be stored in a results database and/or provided to an LMS.

FIG. 5 illustrates example output data 500 from real-time optical lab control system 111, which may be stored, for example, in results database 114 and/or provided to LMS 101. Output data 500 may include basic information about the manufactured lens, such as a production date 501, product information 502, and manufacturing equipment information 503. Real-time optical lab control system 111 may generate statistical analysis 504 for a lens, group of lenses, or a production run, such as deviations and trends in the measure values.

Based upon the deviations and trends identified in the statistical analysis, real-time optical lab control system 111 may calculate compensation coefficients 505 to be applied to future manufacturing runs. These compensation coefficients may be applied by LMS 101 and/or LDS 103 to adjust the lens manufacturing calculations from LDS 103 so that the manufacturing equipment creates a lens with minimal deviations from the desired prescription. Alternatively, the real-time optical lab control system 111 may apply compensation factors directly to the lens manufacturing equipment, such as the blocker, generator, or polisher.

Figure 6:
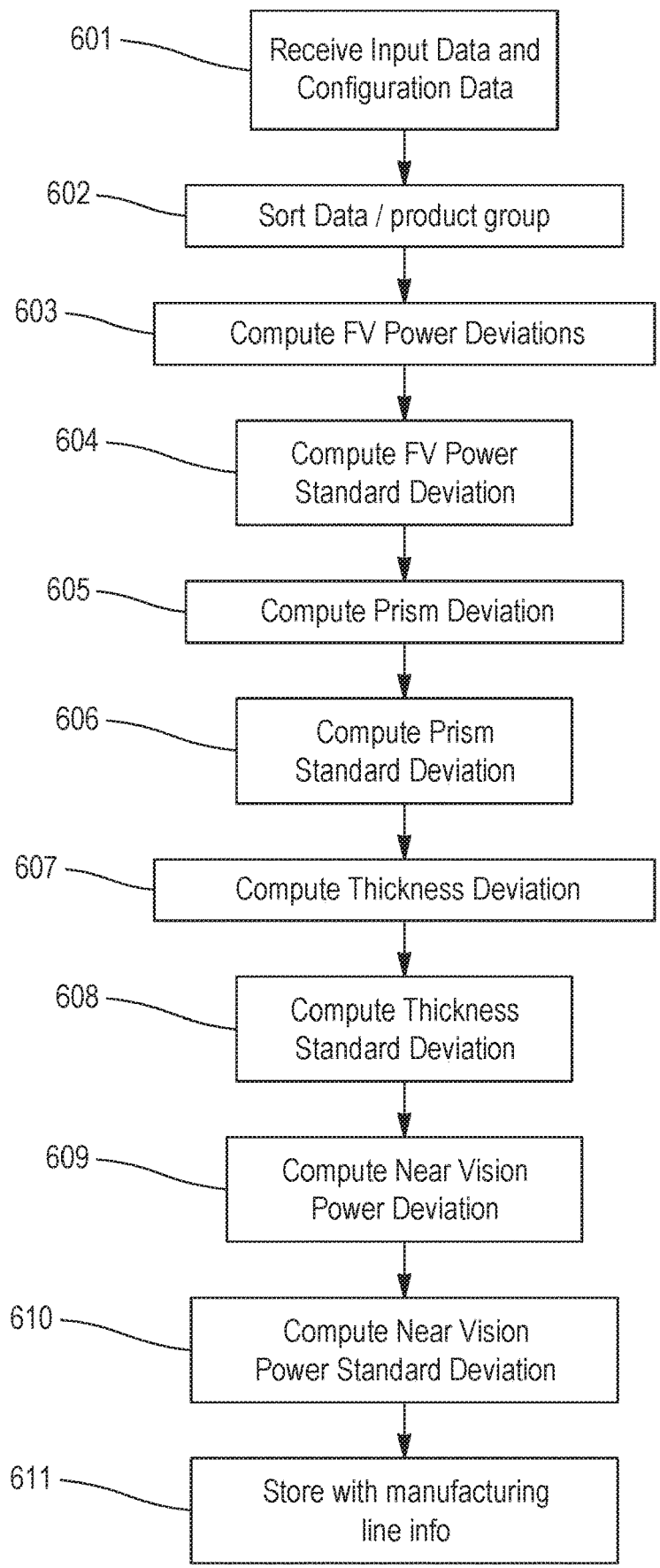
FIG. 6 is a flowchart illustrating a method for computing deviations in an optical lens manufacturing process according to one embodiment.

FIG. 6 is a flowchart illustrating a method for computing deviations in an optical lens manufacturing process according to one embodiment. In step 601, an analyzer receives input data and configuration data. The input data may include, for example, product, prescription, measurement, and equipment data. The input data may be received from a measurements database or an LMS or from other sources. The input data may include the parameters illustrated in FIG. 4. The configuration data includes parameters that define both how the analyzer should handle the input data and what type of output data should be provided. The configuration data may be retrieved from a configuration database and may include parameters such as those illustrated in FIG. 3.

In step 602, the input data may be sorted by product group.

In step 603, the analyzer computes far vision (FV) power deviations per product group. A far vision power deviation (FV-DEV) may be calculated using the FV sphere power deviation (FVspDev) and the Cylinder (CYL) as follows:

$$FV_{SP}Dev=\text{Average}(\text{Nominal FV Sphere}-\text{Measured FV Sphere}) \quad (Eq. 1)$$

$$FV\text{ Sphere}+\text{Cylinder Deviation}=\text{Average}((\text{Nominal FV Sphere}+CYL)-(\text{Measured FV Sphere}+CYL)) \quad (Eq. 2)$$

$$FV\text{-}DEV=\text{Average}(FV_{SP}Dev, FV\text{ Sphere}+\text{Cylinder Deviation}) \quad (Eq. 3)$$

In step 604, the analyzer computes the far vision power standard deviation.

In step 605, the analyzer computes prism deviations per product group. The prism deviations may be calculated using the nominal and measured horizontal prism (HP) and vertical prism (VP) as follows:

$$\text{Horizontal Prism Deviation}=\text{Average}(\text{Nominal HP}-\text{Measured HP}) \quad (Eq. 4)$$

$$\text{Vertical Prism Deviation}=\text{Average}(\text{Nominal VP}-\text{Measured VP}) \quad (Eq. 5)$$

In step 606, the analyzer computes the prism standard deviation.

In step 607, the analyzer computes thickness deviations per product group. The thickness deviation may be calculated as follows:

$$\text{Thickness Deviation}=\text{Average}(\text{Nominal Thickness at Prism Reference Point (PRP)}-\text{Measured Thickness at PRP}) \quad (Eq. 6)$$

In step 608, the analyzer computes a thickness standard deviation.

In step 609, the analyzer computes a near vision (NV) power deviation for each product group. The near vision power deviation may be calculated as follows:

$$NV\text{ Add Power}=NV\text{ Sphere Power}-FV\text{ Sphere Power} \quad (Eq. 7)$$

$$NV\text{ Add Power Deviation}=\text{Average}(\text{Nominal NV Add Power}-\text{Measured NV Add Power}) \quad (Eq. 8)$$

In step 610, the analyzer computes a near vision standard deviation.

In step 611, the analyzer stores the far vision deviation, prism deviation, thickness deviation, and near vision deviation data along with relevant manufacturing line data to a database, such as results database 114.

Figure 7:
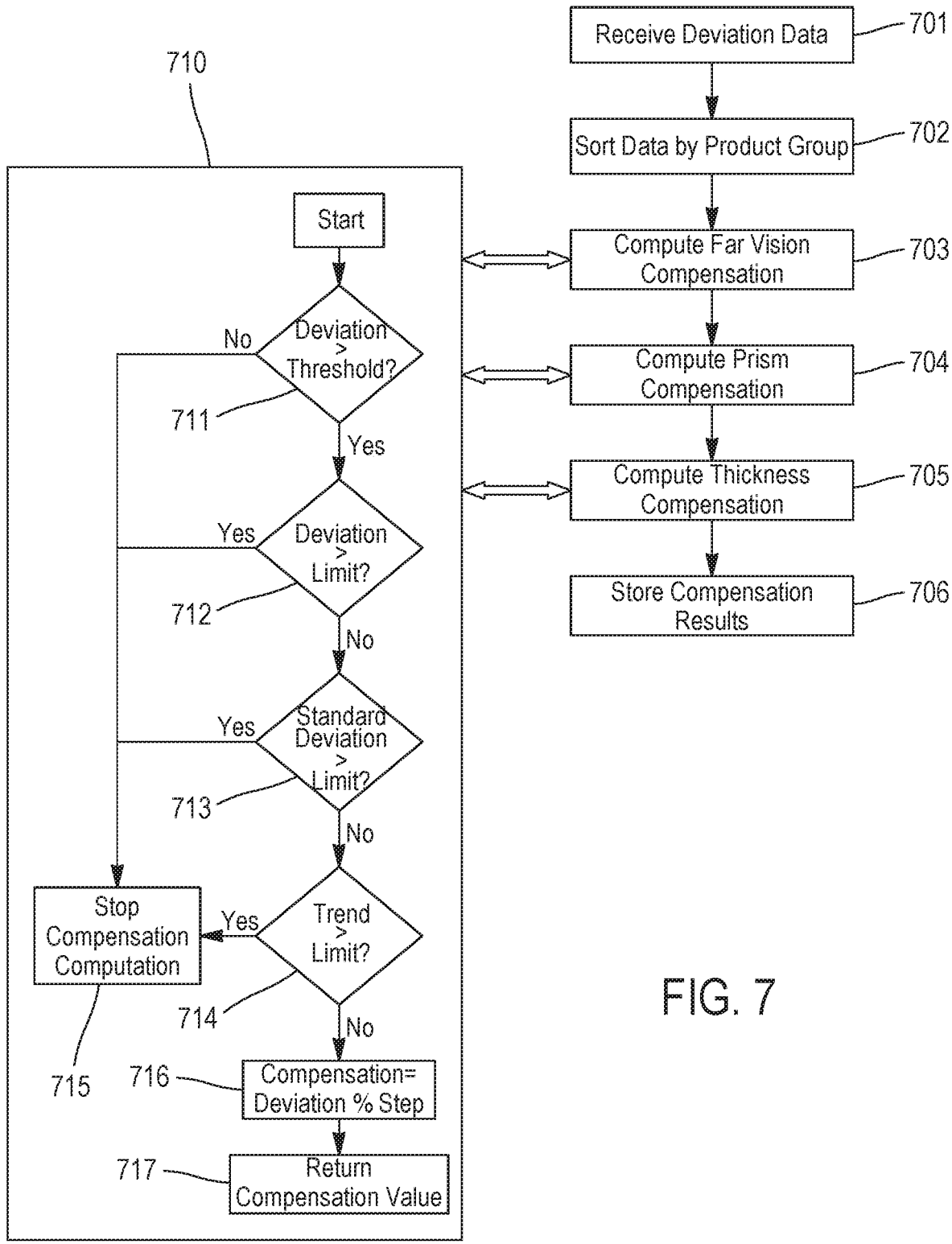
FIG. 7 is a flowchart illustrating a method for calculating compensation values according to one embodiment.

FIG. 7 is a flowchart illustrating a method for calculating compensation values according to one embodiment. In step 701, the deviation data for a group of measurements is received, such as by retrieving deviation data from a results database 114. In step 702, the data is sorted by product group. In step 703, a far vision compensation is computed. The far vision compensation, and the other compensation values, may be determined using the compensation calculation sub-process illustrated as 710, which is discussed in more detail below. After a far vision compensation value is returned from sub-process 710, the process moves to step 704 where a prism compensation is computed. A thickness compensation value is then computed in step 705.

Each of the compensation computations may use the steps illustrated in sub-process 710. In step 711, a comparison is made between a deviation and a threshold. Using the far vision parameter as an example, the far vision deviation value as computed in step 603 (FIG. 6) may be compared to a compensation threshold 302 (FIG. 3) from the configuration database. If the computed far value deviation is less than the 0.03 diopter far vision power threshold (FIG. 3), then the process moves to step 715 and the compensation computation ends (i.e., sub-process 710 returns to the last step in the main process 703-705). Otherwise, if the computed deviation is greater than the threshold, then the process moves to step 712.

In step 712, the deviation computation is compared to a limit. Using the far vision example again, if the deviation is greater than a 0.2 diopter far vision power limit (FIG. 3), then the process moves to step 715 and the compensation computation ends. Otherwise, if the deviation is below the limit, then the process moves to step 713.

In step 713, the standard deviation computation is compared to a limit. Referring to the far vision example, if the standard deviation is greater than a 0.15 diopter far vision power (FIG. 3), then the process moves to step 715 and the compensation computation ends. Otherwise, if the standard deviation is below the limit, then the process moves to step 714.

In step 714, the deviation trend computation is compared to a limit. For example, if the deviation trend is greater than 0.1 diopter per week (FIG. 3), then the process moves to step 715 and the compensation computation ends. Otherwise, if the deviation is below the limit, then the process moves to step 716.

In step 716, the compensation value is set to the step value defined for the relevant parameter. For the far vision compensation, the step is 0.01 diopter (FIG. 3). This compensation value is returned to the main process in step 717.

Compensation values for each parameter are then stored in step 706. The compensation values may be stored, for example, in a results database 114 (FIG. 1). The compensation values are then available to the LMS, which can adjust the manufacturing parameters as appropriate to neutralize the deviations that have been measured. Compensation values may also be applied by the LDS calculator. Alternatively, the real-time optical lab control system 111 may apply the compensation values directly to the surfacing equipment (e.g., directly apply compensations to a blocker, a generator, and/or a polisher).

It will be understood that steps 601-611 of the process illustrated in FIG. 6 and steps 701-717 of the process illustrated in FIG. 7 may be executed simultaneously and/or sequentially. It will be further understood that each step may be performed in any order and may be performed once or repetitiously.

Embodiments take into account any deviations from the nominal values (i.e., expected optical power, expected optical power map, etc.) and calculate compensation factors that are provided to the LMS or Rx Lab equipment. The analysis system relies on a set of mathematical formulas and statistical computations to determine the Rx Lab's industrial performance in terms of optical yields. The configuration of the Rx Lab manufacturing system is also taken into account to determine the compensation factors that are calculated from the statistical computation results. Both the results of the statistical analysis as well as the decisions taken (i.e., compensation factors to apply) are made available as an output of the system to the user and to other systems in the environment.

Measurements

The system takes into account two types of measurements. First, the system uses measurements of the back surface of the lens and measurements final lens. These measurements are fed into the system's database and allow the system to compute the Rx Lab's performance (e.g., yields, deviations, etc.) per product group (e.g., product code, design, design vendor, material, etc.).

Second, the systems uses measurement of the front surface, which may be Semi-Finish lens or a surfaced convex lens. These measurements (e.g., actual front curve versus theoretical, sphericity of the front side, optical map versus theoretical front side, design deviations, etc.) may be used by the system to calculate the back surface that should be generated in order to compensate for front surface deviations. In one embodiment, these measurement do not feed into the overall statistical analysis system, but are used on a per prescription, per job basis wherein the front side of the lens blank that will be used to make a final lens is measured.

User Interface

Users interact with the system using a GUI interface in one embodiment. Through this interface, the user configures the system by defining the behavior of the calculation, the speed of reaction to deviations, and the amplitude of the commands that the system provides. This is accomplished by configuring thresholds for the optical deviations that can be compensated by the system and/or configuring the amplitude of the compensation factors. The user may also define which measurements should be compensated (e.g., one or more of prism, far vision, near vision, thickness, and other lens parameters).

This system also allows the user to monitor the industrial performance of the Rx Lab by displaying statistical analysis results. For example, the user may visualize–on a per product, per material, or per lens design vendor basis–the optical deviations of the manufactured lenses compared to the nominal (i.e., expected/prescription) values. Analysis of the Rx Lab's trends over time also enables to system and the user to detect abnormal trends in the Rx Lab's surfacing process and equipment.

Integration and Communication

The system may be integrated in an Rx Lab environment in multiple ways. In one embodiment, the real-time optical lab compensation system may be a standalone system that provides a service to the LMS. Such a standalone system may be co-located with the Rx Lab or may be remotely located. The real-time optical lab control system may communicate with the LMS and other laboratory equipment via a public or private data network 115, such as an intranet, Local Area Network (LAN), Wide Area Network (WAN), or the Internet. In some embodiments, the real-time optical lab compensation system is based in a remote location and provides services to multiple independent Rx Labs.

In a standalone configuration, the real-time optical lab compensation system continuously receives the measurements from the production line and performs all necessary computations. The results are then stored within the system and are accessible by the LMS upon query. The LMS may send a request to the real-time optical lab compensation system to request the relevant compensation factors (e.g., per product, per material, per LDS vendor, for repeat jobs, etc.). The compensation factors may be sent to the LDS calculators so that corrected manufacturing parameters will be computed. The compensation factors may be provided to LDS calculators by the LMS or directly from the real-time optical lab compensation system. Alternatively, the LMS may use the compensation factors to modify the manufacturing parameters it receives from the LDS calculator before sending commands to the Rx Lab equipment.

In the case of an integrated real-time optical lab compensation system, the system itself may modify the commands that are sent to the Rx Lab equipment. For example, the real-time optical lab compensation system may modify the instructions (e.g., an industry standard data file, such as a device record or an OMA message) and generator surface files on the LMS server. The following corrections may be applied by the real-time optical lab compensation system either during a re-do of an unsatisfactory production run or to compensate for deviation measurements observed over a number of runs:

modify the back surface to compensate for the Rx Lab's power deviations or to compensate for a specific prescription deviation (e.g., by adding a spheric surface to compensate for far vision power deviation, or by tilting the surface to add prism—adding spheric surfaces allows for the system not to modify the design);

modify the blocked and/or generated prism commands in the OMA files to compensate for prism deviations;

modify the generator thicknesses (e.g., the final blocked lens thickness or OMA message "SVAL" tag) to compensate for thickness deviations; and modify the generator prism commands to compensate for prism deviations (i.e., this may either be integrated within the back surface or may be sent to the generator along with the back surface).

Computation

The real-time optical lab compensation system may use two or more distinct computation algorithms. In one embodiment, the system continuously computes the Rx Lab's statistical performance (e.g., yields, deviations, etc.) in real-time. In other embodiments, the system computes a compensation for a given prescription sent by the LMS.

FIG. 8 is a flowchart illustrating a method for continuously computing statistical performance of the Rx Lab. This real-time continuous computation is performed by the system to determine overall compensation factors for a given set of products. This may apply to each product separately or to a given product group (e.g., by lens design vendor, material, or a user specific product family). This calculation stores the measurements and the final analyses, such as yields, deviations, and determined compensation factors, in the measurements and results databases. The algorithm relies on the user's configuration to arrange the data and computes the appropriate compensation factors (e.g., prism, thickness, optical power, surface geometry, optical design, etc.). This analysis is computed in real-time and is updated with each new incoming measurement from the production line. Alternatively, the updates may be time driven (e.g., updated every thirty minutes).

In step 801, new measurements are received–either in real-time or periodically.

In step 802, an optical power deviation is calculated. In step 803, a prism deviation is calculated. In step 804, a thickness deviation is calculated. In step 805, surface geometry and optical design deviations are calculate. Steps 802-805 may be executed simultaneously and/or sequentially. It will be further understood that the steps may be performed in any order and may be performed once or repetitiously. Additionally, other deviation computations may be included with these steps.

In step 806, the real-time optical lab control system arranges the computed data and measurements according to the user's preferences. In step 807, compensation factors are computed according to the user-defined thresholds and limits as defined in a configuration database, for example. The computations are then stored to a measurements database, a results database, or both in step 808. The process then returns to step 801 and repeats for the next group of measurements.

FIG. 9 is a flowchart illustrating a method for compensating for a given prescription by the LMS. The LMS sends a prescription with all the necessary information (e.g., product code, material, lens design vendor, nominal power, prism and lens thickness, front surface optical, geometrical deviation, etc.) to the real-time optical lab control system. The system relies on stored compensation factors (and the front surface deviations, if available) to compensate this particular prescription. An updated prescription (e.g., new blocked or generated prism values, new generator surface file matrix, new generator thicknesses, etc.) is then returned to the LMS or is provided directly to surfacing equipment.

In step 901, the real-time optical lab control system looks up the relevant product in stored compensation groups. The stored compensation groups may include data collected over past analyses of lens production runs. The data may be stored in a configuration database, a results database, or both.

In step 902, the real-time optical lab control system computes an adjusted generator command. The adjusted generator command may include, for example, an adjusted final generator thickness (SVAL), or an adjusted generator surface, or both.

In step 903, the system computes an adjusted blocker command. The adjusted blocker command may include, for example, one or more of an adjusted blocked horizontal prism, an adjusted blocked vertical prism, an adjusted blocked prism module, and an adjusted blocked prism axis.

Steps 902 and 903 may be executed simultaneously and/or sequentially. It will be further understood that the steps may be performed in any order and may be performed once or repetitiously. Additionally, other compensation computations may be included with these steps.

In step 904, the adjusted generator command and adjusted blocker command are sent to the LMS or to the production equipment. For example, an adjusted OMA file may be created using the adjusted commands, or the adjusted commands may be sent directly to the equipment.

Product Groups

The system allows the user to define how the data will be analyzed and organized. The user may define how the compensations relate to the products used or created in the lab by defining product groups: material group, lens design vendor groups, custom user defined product group, Semi-Finish product groups (i.e., group by product base for Single Vision (SV) SF, or product base+addition+eye for Progressive Addition Lenses (PAL) SF). The user may then visualize the analyses in a monitoring system, such as a GUI user interface, using the product groups defined. The system compensates the prescriptions sent by the LMS by using data relative to each prescription's product group.

Compensations

In one embodiment, the system is configured to start compensating for optical power deviations at 0.03 diopter. This implies that if the average deviation for a given product or product group is above 0.03 diopter, then the system will set a compensation value of 0.03 diopter. For any deviation values below this threshold value, there will be no compensations. For prism values, the threshold is set in the example embodiment (FIG. 3) to 0.05 degrees of prism. For thickness, the threshold is set to 0.05 mm. A threshold on yields may also be set in the configuration. In the example embodiment (FIG. 3), the compensations will be applied by the system only if the optical yields of the Rx Lab drop below 98% for a given product group.

The compensation steps may be set to selected values, such as 0.01 diopter for FV power, 0.01 degrees prism, and 0.01 mm thickness, for example. Accordingly, if the deviation for a product group is computed to be 0.041 diopter, the system will set a compensation value of 0.04 diopter, such as a corresponding multiple of the 0.01 diopter step value.

In order to prevent the system from diverging and correcting a production malfunction, a limit is set on the maximum compensation value for a given product or group. For example, a 0.20 diopter limit may be set on the FV power compensation.

A limit may also be set on the standard deviation of the data. This ensures that the compensation value is supported up by sufficiently coherent data and that the system does not compensate an unstable manufacturing line.

Deviation Trends

The system is implemented so as to prevent the Rx Lab from compensating issues inherent to the production process or equipment. Therefore, thresholds and limits may be defined for the power and prism deviations over time.

Manufacturing

The measurements and computed compensation factor data may be tracked by production equipment line, such as tracking the blocker, generator and polisher that are used for surfacing each lens measured.

Calculation

The real-time statistical analysis and compensation computation relies on the above described configuration system to organize and analyze the data. For each product group defined by the user, the optics deviations are computed and recorded. The statistics used may be simply an average deviation, such as a difference between the nominal and the measurement, of each physical quantity as well as the standard deviation. Other methods and formulas of calculating the deviation and standard deviations may also be used. The data is then recorded against the product groups as well as the manufacturing lines so as to track the evolution over time. From this statistical analysis, the system is able to compute the compensation factors to apply to each physical quantity. This calculation component is highly configurable, and the algorithm may check each element, for example, thresholds, limits, trends, etc., against the user defined configuration.

Prescription Compensation Computation

The system may provide two distinct services: (1) a service that is integrated within the Rx Lab manufacturing line, and (2) a standalone service. The integrated service computes adjusted equipment commands for the generator and blocker equipment. The standalone service returns the adjusted prescription to the LMS, which then sends the adjusted prescription to the optical LDS calculator. These services may be used to automatically compensate a given Rx based off the Rx Lab's overall deviations. The services may also be used to compensate a prescription for both the Rx Lab's deviations and for specific job deviations. The specific job deviations may be compensated for front surface deviation or for a job re-do. In the event of a job re-do, the prescription may be compensated for the deviation observed during that specific job instead of using the overall lab deviation for that general product.

The configuration system allows the user to determine how prism is compensated. The prism may be generated, for example where it is added to the back surface or command sent to the generator, or blocked. The configuration system allows the user to specify the priority and the capacity of both the generator and blocking equipment. Therefore, if the user puts a priority on the blocker, the system will attempt to block the additional prism or compensation prism until the blocked prism capacity is reached at which point the remaining compensation prism will be sent to the generator.

Compensated Surface Computation

Compensations may be applied by the LMS, the LDS, or by the real-time optical lab control system. For example, the LMS or LDS may adjust a surface file by summing multiple surfaces so that the original calculated surface is returned with compensation surfaces. Alternatively, the real-time optical lab control system may provide compensations directly to the optical lab equipment to modify the surfacing process. Through this computation, the generator surface sent by the LDS for the prescription may be compensated in far vision power and prism, for example. The system may compensate for any optical or geometry deviations in a finished lens. Generally, however, it is not recommended to compensate for cylinder deviations as a cylindrical compensation may distort the surface design.

System Enhancements

The example embodiments described above focus on optical power, prism and thickness compensations. These compensations may be enhanced through optical design compensations.

Process Smoothing Compensation

The previous system may be enhanced with an analysis of the surfacing process's inherent smoothing behavior. The measurements described earlier include the measurement of the back surface geometry. This measurement will allow the system to compare the theoretical surface to the actual surface and compare the "sharpness." The theoretical surface is characterized by certain design features that are represented by contour maps. The contour map of a surface geometry will show the "peaks and valleys" of the surface, with the height differences and surface accelerations throughout the surface. The theoretical surface will always have a better sharpness, with higher "peaks" compared to the actual surface produced by the surfacing process. This is inherent to the surfacing process, which includes a polishing phase.

The measurement of the actual surface allows the system to compute the smoothing coefficient of the given surfacing line, which may include a particular blocker, generator, and polisher combination. Knowing this coefficient, it is possible for the system to enhance the features of the back surface before surfacing. When the LMS calls the system to compensate the prescription before surfacing, the system computes the back surface complexity and contour map and predicatively compensates the prescription to account for the smoothing behavior of the Rx Lab's process. This calculation may be performed by taking into account the manufacturing line on which the prescription will be manufactured since different equipment may produce different process deviations.

Predictive Process Smoothing Compensation

The computation process adjusts the surface to be generated in order to account for the process smoothing coefficient. The compensation factor pulled from the analysis database is computed in real-time by the statistical analysis algorithm. This factor represents a percentage of the feature reduction induced by the surfacing process. For example, if a feature is 1 mm high, where the peak is 1 mm above the valley, in the theoretical surface, but the geometry measured on the final back surface is only 0.8 mm high, then the process will be analyzed as having a 20% feature reduction deviation. Thus, when the LMS wants to correct a prescription before surfacing it, this prescription can be processed by an algorithm that will enhance the surface features by the process-deviation amount, for example, the algorithm will increase the peak height by 20% to account for the expected deviation.

This compensation of the process may also be achieved by modifying the command sent to the polisher for a given prescription. By modifying the polishing time proportionally to the process feature reduction coefficient, a similar result may be obtained. However, this modification of the polishing process could also impact cosmetics of the final lens and, therefore, may be a less desirable modification.

Optical Design Compensation

The system may also be enhanced for design integrity compensation. The previous system includes design integrity measurements, which can be measured in several locations on the actual generated surface or for the entire final lens: near vision, far vision, intermediate vision and peripheral vision. The design integrity is measured in optical power maps. The variation of the optical power across the surfaced lens must match the expected design. The design positioning can and should be compensated by modifying the front, back, or both sides depending on the type of lens. Finally, the addition power of the lens may be measured and compensated with respect to the design. The near vision power, unlike the far vision power, is linked to the design with respect to the corridor length, progression of the design and position of the near vision with respect to intended design.

The design compensation for the process and optical power compensations may be achieved by modifying the surface matrix sent to the generator.

For each zone of the design, which may be Far Vision, Intermediate Vision, Near Vision, Peripheral Vision zones, for example, a surface file can be created with compensation factors for sphere and cylinder. The compensation surface would be flat in all areas outside the compensated location. For the targeted location, a sphero-torical surface, comprising the sphere plus cylinder, can be created using the compensation values calculated by the statistical analysis algorithm.

In order to compensate for addition deviations, two example methods may be used: (1) a call may be made to the design vendor for a plano surface with the addition compensation as a prescription addition, or (2) the near vision sphere and cylinder can be compensated by creating a surface having the size and location of the near vision on the lens using as input the inset and progression length of the design.

Once the compensation surfaces are calculated, they can be summed to the generator surface and sent back to the LMS or directly to the generator equipment.

Several methods of correcting the design position include:
measuring the front side design position error before surfacing, and adjusting the back surface to be aligned relative to the front surface;
adjusting the back surface position relative to the front after blocking error is measured; and
adjusting the back surface position relative to the average position error for the product, which may comprise the average deviation calculated by the previously described statistical analysis algorithm.

The back surface is then translated and rotated to compensate for the measured or predicted error and sent back to the surfacing equipment or LMS.

An example embodiment of a real-time optical lab control system comprises measurement devices for taking optics, optical maps, and surface geometry measurements and has data storage capabilities. The system is configured to compute statistical yields, deviations from nominal, and Rx Lab performance. The system is further configured to analyze both optical deviations, such as the far vision power, near vision power, prism, power map/design deviations, etc., and geometrical deviations, such as thickness, lens surface geometry, etc. The system is further configured to group the analysis by product categories, such as by Semi-Finish, product code, design, design vendor/LDS, material, etc. The system is further comprises a user interface capable of allowing the user to monitor Rx Lab performance and to configure compensation behavior of the system using, for example, a feed-back loop.

Some embodiments of real-time optical lab control system provide real-time compensation for the Rx Lab surfacing process using a method for computing statistical analysis, for example, average deviations, standard deviations, trends, etc., based off measurements of production lenses and computing compensation factors based off the statistical analysis. The method may further compensate an already computed prescription from the LDS, for example, back surface computation, equipment prism and thickness adjustment, etc.

The real-time optical lab control system may provide services to other systems in an Rx Lab, such as the LMS or surfacing, coating or finishing equipment, to compensate prescriptions in real-time.

The real-time optical lab control system may provide compensation factors back to a given caller, such as an LMS, to correct the prescription before calculation. The corrected prescription is then sent to the LDS for design calculation.

The real-time optical lab control system may compensate an already calculated prescription and provide corrected equipment commands, for example, blocker prism commands, generator back surface, generator thicknesses, generator prism commands, polisher macro commands, etc.

The real-time optical lab control system may provide the capability to compensate a given prescription before a re-do, such as after a job has already surfaced a lens blank, but failed to meet standards, solely based off the prescription deviation without referencing the entire statistical lab deviation.

Embodiments of a real-time optical lab control system provide design compensation by performing one or more of the following steps:
  receiving as input the measurement of the surface power map deviations, such as front side, back side, final lens, etc.;
  receiving as input the measurement of the design position error, which may be due to front surface, back surface, or both surfaces, for example;
  computing localized power deviations, such as near, far, intermediate, or peripheral vision;
  computing localized surface compensations, such as sphere and cylinder;
  querying an external Lens Design System to retrieve addition compensation surface data;
  translating and rotating a surface to compensate for design position error;
  computing a compensated generator surface matrix;
  providing a compensated back surface to account for design deviation;
  providing a compensated back surface to account for addition deviation;
  providing a compensated back surface to account for the design position deviation either compensated for a job re-do with the job's deviation measurements, or compensated for average design position errors that are calculated by the statistical analysis system.

Embodiments of a real-time optical lab control system provide predictive process compensation by performing one or more of the following steps:
  receiving as input measurements of a front surface of a lens, which may correspond to Semi-Finish or surfaced convex side of future final lens, in optics, such as front curve, optical map/design, sphericity of the front surface, etc., and geometry, such as geometry deviations/contour map;

computing the deviation of a manufactured front surface compared to a theoretical front surface, such as, for example, front curve compared to theoretical curve, optical design compared to theoretical design, theoretical geometrical contour map compared to actual measured contour map;

computing for the Rx Lab process smoothing coefficients per production equipment/production line;

compensating a back surface to be generated to achieve a targeted final lens power and design based off front surface deviation measurements;

computing a complexity and "sharpness," such as surface accelerations, peaks and valleys, surface contour map, etc., for a back surface to be generated;

enhancing back surface features before surfacing, such as to avoid polishing and smoothing of the surface features during the process;

providing a compensated back surface to account for front surface deviations, such as, for example, addition of spherical compensation; and providing a compensated or feature enhanced back surface to account for process "smoothing" behavior.

An example embodiment of a real-time optical lab control system comprises an LMS coupled to an LDS and to lens surfacing equipment. Measuring equipment measures parameters of lens that have been processed by the lens surfacing equipment. The measurements are provided to an analyzer that computes deviations in the processed lens compared to nominal optical prescription values. The analyzer uses these deviations to computer compensation factors that may be used to modify the processing of additional lens blanks in order to minimize the deviations. The compensation factors may be provided directly to the lens surfacing equipment by the analyzer. The analyzer may alternatively provide the compensation factors to the LMS and/or LDS. The LMS may apply the compensation factors to an optical prescription before sending the prescription to an LDS or may apply the compensation factors to a lens design received from the LDS or may use the compensation factors to modify lens surfacing equipment commands. The LDS may use the compensation factor when calculating a lens design from an optical prescription.

The compensation factors may represent deviations introduced by the lens surfacing equipment, such as deviations in the final lens product caused by a blocker, generator, or polisher.

In other embodiments, the deviations may represent flaws that are present in a SF lens blank before it is processed by the surfacing equipment. As such, the compensation factors may apply to a particular batch or lot of SF lens blanks having a common flaw or error as received from a supplier before processing.

In other embodiments, the compensation factors may be selected for a known brand of lens surfacing equipment, such as equipment from SATISLOH, ESSILOR, or any other manufacturer. For example, an LMS may select the compensation factors for a particular brand of equipment once the LMS has identified the lens surfacing equipment to be used for a manufacturing run. The compensation factors for a particular brand may be used, for example, to compensate for typical deviations that are observed in the particular brand of equipment without requiring a lab to measure deviations and to develop its own set of compensation factors.

The following systems and methods represent example embodiments of a real-time optical lab control system.

A system for compensating for deviations in an optical lens manufacturing process comprises:

an analyzer configured to compute deviations in one or more surfaced optical lenses based upon nominal optical prescription values and parameters measured on one or more lenses output from lens surfacing equipment, the analyzer further configured to compute compensation factors for one or more future optical lens manufacturing runs based upon the deviations.

In the system, the analyzer may be further configured to provide the compensation factors directly to the lens surfacing equipment.

The system further comprises a LMS coupled to the lens surfacing equipment, the LMS configured to receive compensation factors from the analyzer and to apply the compensation factors during one or more future optical lens manufacturing runs.

In the system, the LMS is further configured to apply the compensation factors by adjusting optical prescriptions or to modify lens surfacing equipment commands.

In the system, the lens surfacing equipment commands comprise one or more of: blocker prism commands, generator back surface commands, generator thicknesses commands, generator prism commands, and polisher macro commands.

In the system, the deviations may be the result of wear over time in the lens surfacing equipment itself or in consumables used by the lens surfacing equipment.

In the system, the compensation factors may be selected based upon one or more of the amount of lens surfacing equipment wear, the brand of lens surfacing equipment, the brand of consumable used, and the type of consumable used.

In the system, the LMS is further configured to adjust an optical prescription to compensate for computed deviations in the lens surfacing equipment before sending the optical prescription to a Lens Design System (LDS).

In the system, the LMS is further configured to adjust an optical design received from a Lens Design System (LDS) calculator to compensate for computed deviations in the lens surfacing equipment.

In the system, the analyzer component is further configured to compute compensation factors for deviations in one or more lens blanks.

The system further comprises:

lens measuring equipment for automatically measuring parameters of lenses output from the lens surfacing equipment; and memory coupled to the lens measuring equipment and configured to store measurement data.

The system further comprises:

memory coupled to the analyzer and configured to store user-defined analyzer configuration data.

The system further comprises:

an LDS configured to calculate a lens design using received optical prescription data, the lens design calculated using compensation factors computed by the analyzer.

In the system, the LDS receives the compensation factors from an LMS.

In the system, the LDS receives the compensation factors directly from the analyzer.

A method for computing compensation factors for optical lens manufacturing, comprises:

automatically computing manufacturing deviations in one or more optical lenses using nominal optical prescription values and stored measurements of lenses that have completed a surfacing process; and computing compensation factors for one or more future optical lens manufacturing runs based upon the manufacturing deviations.

The method further comprises:

measuring parameters of the one or more optical lenses upon completion of the surfacing process; and storing the measured parameters to a measurement database.

In the method, the compensation factors correspond to one or more of an amount of lens surfacing equipment wear, a brand of lens surfacing equipment, a brand of consumable used, and a type of consumable used.

In the method, the manufacturing deviations comprise optical deviation or geometrical deviations or both.

In the method, the optical deviations comprise one or more deviations of far vision power, near vision power, prism, power map, and optical design.

In the method, the geometrical deviations comprise one or more deviations of thickness and lens surface geometry.

The method further comprises:

grouping the computed manufacturing deviations or the compensation factors or both by one or more categories comprising: Semi-Finish, product code, optical design, design vendor, Lens Design System (LDS), and material categories.

The method further comprises:

computing statistical deviations based upon the computed manufacturing deviations; and computing the compensation factors for the future optical lens manufacturing runs based upon the statistical deviations.

The method further comprises:

providing the compensation factors to a Lab Management System (LMS) for adjustment of commands provided to lens manufacturing equipment to compensate for the computed manufacturing deviations.

In the method, the commands provided to lens manufacturing equipment comprise one or more of: blocker prism commands, generator back surface commands, generator thicknesses commands, generator prism commands, and polisher macro commands.

The method further comprises:

providing the compensation factors to an LMS for adjustment of an optical prescription to compensate for the computed manufacturing deviations before sending the optical prescription to an LDS.

The method further comprises:

providing the compensation factors to an LMS for adjustment of an optical prescription received from an LDS calculator to compensate for the computed manufacturing deviations.

The method further comprises:

identifying, from the computed manufacturing deviations, a substandard lens that has completed the surfacing process, wherein one or more measurements of the substandard lens are outside tolerances established for optical prescription values associated with the substandard lens; and applying the computed compensation factors prior to repeating a manufacturing run to replace the substandard lens.

A system for compensating for deviations in an optical lens manufacturing process, comprises:

an LMS coupled to lens surfacing equipment, the LMS configured to receive compensation factors to be applied to one or more future optical lens manufacturing runs, the compensation factors based upon manufacturing deviations computed from measurements of lenses in prior manufacturing runs, the LMS further configured to apply the compensation factors to compensate for manufacturing deviations by adjusting optical prescriptions or to modify lens surfacing equipment commands.

In the system, the lens surfacing equipment commands comprise one or more of: blocker prism commands, generator back surface commands, generator thicknesses commands, generator prism commands, and polisher macro commands.

In the system, the LMS component is further configured to adjust an optical prescription to compensate for computed deviations in the lens surfacing equipment before sending the optical prescription to an LDS.

In the system, the LMS component is further configured to adjust an optical prescription received from an LDS calculator to compensate for computed deviations in the lens surfacing equipment.

In the system, the LMS component is further configured to compensate for deviations in one or more lens blank.

In the system, the compensation factors may be selected for a particular brand of lens surfacing equipment, wherein the compensation factors for the particular brand are used to compensate for typical deviations that are observed in the particular brand of equipment.

The system further comprises:

lens measuring equipment for automatically measuring parameters of lenses output from lens surfacing equipment; and memory coupled to the lens measuring equipment and configured to store measurement data.

The system further comprises:

an analyzer configured to compute manufacturing deviations in one or more optical lenses based upon nominal optical prescription values and parameters measured from lenses output from lens surfacing equipment, the analyzer further configured to compute compensation factors for one or more future optical lens manufacturing runs based upon the manufacturing deviations.

A system for compensating for deviations in an optical lens manufacturing process, comprises:

an LDS coupled to an LMS, the LDS configured to calculate a lens design using optical prescription data received from the LMS, the lens design calculated using compensation factors computed from measurements of lenses in one or more prior manufacturing runs.

In the system, the LDS receives the compensation factors from the LMS.

In the system, the compensation factors are incorporated in the optical prescription data.

In the system, the LDS receives the compensation factors from an analyzer.

In the system, the analyzer is configured to compute manufacturing deviations in one or more optical lenses based upon nominal optical prescription values and parameters measured from lenses output from lens surfacing equipment, the analyzer further configured to compute the compensation factors based upon the manufacturing deviations.

In the system, the LDS is further configured to compensate for deviations in one or more lens blank.

Figure 10:
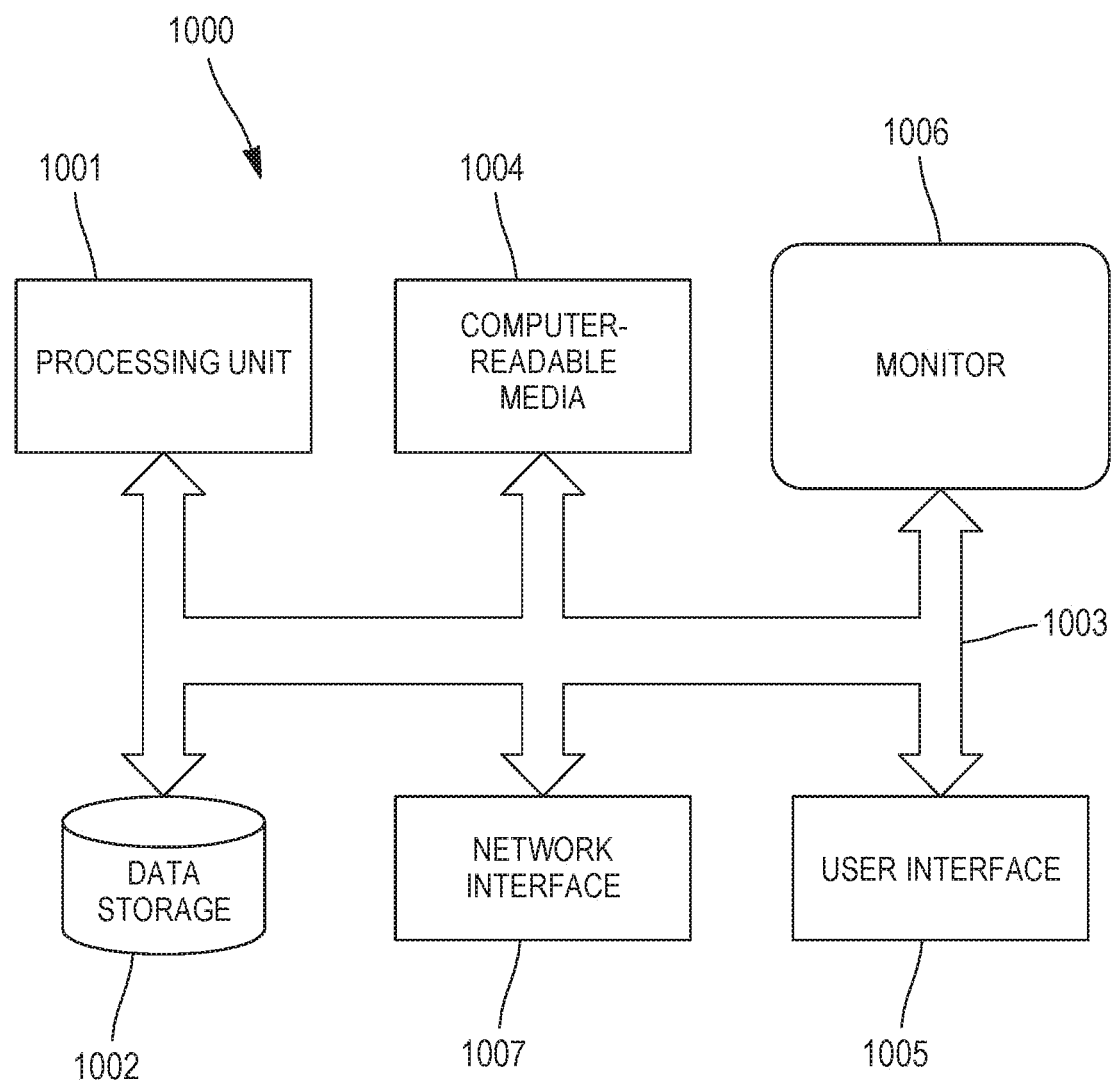
FIG. 10 illustrates an example of a suitable computing and networking environment on which a real-time optical lab control system may be implemented.

FIG. 10 illustrates an example of a suitable computing and networking environment 800 on which the examples of FIGS. 1-9 may be implemented in a real-time optical lab control system. The computing system environment 800 is only one example of a suitable computing environment and is not intended to suggest any limitation as to scope of use or functionality. The real-time optical lab control system is operational with numerous other general purpose or special purpose computing system environments or configurations.

Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The real-time optical lab control system may be described in the general context of computer-executable instructions, such as program modules, being executed by a computer. Generally, program modules include routines, programs, objects, components, data structures, and so forth, which perform particular tasks or implement particular abstract data types. The real-time optical lab control system may also be practiced in distributed computing environments where tasks are performed by remote processing devices that are linked through a communications network. In a distributed computing environment, program modules may be located in local and/or remote computer storage media including memory storage devices.

With reference to FIG. 10, an exemplary system for implementing various aspects of the real-time optical lab control system may include a general purpose computing device in the form of a computer 1000. Components may include, but are not limited to, various hardware components, such as processing unit 1001, data storage 1002, such as a system memory, and system bus 1003 that couples various system components including the data storage 1002 to the processing unit 1001. The system bus 1003 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1000 typically includes a variety of computer-readable media 1004. Computer-readable media 1004 may be any available media that can be accessed by the computer 1000 and includes both volatile and nonvolatile media, and removable and non-removable media, but excludes propagated signals. By way of example, and not limitation, computer-readable media 1004 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1000. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 1002 includes computer storage media in the form of volatile and/or nonvolatile memory such as read only memory (ROM) and random access memory (RAM). A basic input/output system (BIOS), containing the basic routines that help to transfer information between elements within computer 1000, such as during start-up, is typically stored in ROM. RAM typically contains data and/or program modules that are immediately accessible to and/or presently being operated on by processing unit 1001. By way of example, and not limitation, data storage 1002 holds an operating system, application programs, and other program modules and program data.

Data storage 1002 may also include other removable/non-removable, volatile/nonvolatile computer storage media. By way of example only, data storage 1002 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 10, provide storage of computer-readable instructions, data structures, program modules and other data for the computer 1000.

A user may enter commands and information through a user interface 1005 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 1001 through a user input interface 1005 that is coupled to the system bus 1003, but may be connected by other interface and bus structures, such as a parallel port, game port or a universal serial bus (USB). A monitor 1006 or other type of display device is also connected to the system bus 1003 via an interface, such as a video interface. The monitor 1006 may also be integrated with a touch-screen panel or the like. Note that the monitor and/or touch screen panel can be physically coupled to a housing in which the computing device 1000 is incorporated, such as in a tablet-type personal computer. In addition, computers such as the computing device 1000 may also include other peripheral output devices such as speakers and printer, which may be connected through an output peripheral interface or the like.

The computer 1000 may operate in a networked or cloud-computing environment using logical connections 1007 to one or more remote devices, such as a remote computer. The remote computer may be a personal computer, a server, a router, a network PC, a peer device or other common network node, and typically includes many or all of the elements described above relative to the computer 1000. The logical connections depicted in FIG. 10 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 1000 may be connected to a public or private network through a network interface or adapter 1007. In some embodiments, a modem or other means for establishing communications over the network. The modem, which may be internal or external, may be connected to the system bus 1003 via the network interface 1007 or other appropriate mechanism. A wireless networking component such as comprising an interface and antenna may be coupled through a suitable device such as an access point or peer computer to a network. In a networked environment, program modules depicted relative to the computer 1000, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for compensating for deviations in an optical lens manufacturing process, comprising:
   an analyzer configured to compute deviations in one or more surfaced optical lenses based upon nominal optical prescription values and parameters measured on one or more lenses output from lens surfacing equipment, the analyzer further configured to compute compensation factors for one or more future optical lens manufacturing runs based upon the deviations, wherein the computing the compensation factors includes adjusting optical prescriptions; and
   a Lab Management System coupled to the lens surfacing equipment, the Lab Management System configured to receive the compensation factors from the analyzer and to apply the compensation factors during the one or more future optical lens manufacturing runs,
   wherein the Lab Management System is further configured to adjust an optical prescription to compensate for computed deviations in the lens surfacing equipment before sending the optical prescription to a Lens Design System.

2. The system of claim 1, wherein the analyzer is further configured to provide the compensation factors directly to the lens surfacing equipment.

3. The system of claim 1, wherein the Lab Management System is further configured to adjust an optical design received from a Lens Design System calculator to compensate for computed deviations in the lens surfacing equipment.

4. The system of claim 1, wherein the analyzer is further configured to compute compensation factors for deviations in one or more lens blanks.

5. A method for computing compensation factors for optical lens manufacturing, comprising:
   automatically computing manufacturing deviations in one or more optical lenses using nominal optical prescription values and stored measurements of lenses that have completed a surfacing process;
   computing compensation factors for one or more future optical lens manufacturing runs based upon the manufacturing deviations, wherein the computing the compensation factors includes adjusting optical prescriptions;
   receiving the compensation factors at a Lab Management System coupled to lens surfacing equipment;
   applying, by the Lab Management System, the compensation factors during the one or more future optical lens manufacturing runs; and
   adjusting an optical prescription to compensate for computed deviations in the lens surfacing equipment before sending the optical prescription to a Lens Design System.

6. The method of claim 5, wherein the compensation factors correspond to one or more of an amount of lens surfacing equipment wear, a brand of lens surfacing equipment, a brand of consumable used, and a type of consumable used.

7. The method of claim 5, further comprising:
   grouping the computed manufacturing deviations or the compensation factors or both by one or more categories comprising: Semi-Finish, product code, optical design, design vendor, Lens Design System, and material categories.

8. The method of claim 5, further comprising:
   computing statistical deviations based upon the computed manufacturing deviations; and
   computing the compensation factors for the future optical lens manufacturing runs based upon the statistical deviations.

9. The method of claim 5, further comprising:
   obtaining the compensation factors from a the Lab Management System for adjustment of commands provided to lens manufacturing equipment to compensate for the computed manufacturing deviations.

10. The method of claim 5, further comprising:
    obtaining the compensation factors from the Lab Management System for adjustment of an optical prescription received from a Lens Design System calculator to compensate for the computed manufacturing deviations.

11. The method of claim 5, further comprising:
    identifying, from the computed manufacturing deviations, a substandard lens that has completed the surfacing process, wherein one or more measurements of the substandard lens are outside tolerances established for optical prescription values associated with the substandard lens; and
    applying the computed compensation factors prior to repeating a manufacturing run to replace the substandard lens.

12. A non-transitory computer-readable medium comprising instructions, comprising instructions stored therein, which when executed by one or more processors, causes the one or more processors to perform a method comprising:
    automatically computing manufacturing deviations in one or more optical lenses using nominal optical prescription values and stored measurements of lenses that have completed a surfacing process;
    computing compensation factors for one or more future optical lens manufacturing runs based upon the manufacturing deviations, wherein the compensation factors correspond to one or more of an amount of lens surfacing equipment wear, a brand of lens surfacing equipment, a brand of consumable used, and a type of consumable used, and wherein the computing the compensation factors includes adjusting optical prescriptions;

receiving the compensation factors at a Lab Management System coupled to lens surfacing equipment;

applying, by the Lab Management System, the compensation factors during the one or more future optical lens manufacturing runs; and adjusting an optical prescription to compensate for computed deviations in the lens surfacing equipment before sending the optical prescription to a Lens Design System.

13. The non-transitory computer-readable medium of claim 12, wherein the method further comprises:

grouping the computed manufacturing deviations or the compensation factors or both by one or more categories comprising: Semi-Finish, product code, optical design, design vendor, Lens Design System, and material categories.

14. The non-transitory computer-readable medium of claim 12, wherein the method further comprises:

computing statistical deviations based upon the computed manufacturing deviations; and computing the compensation factors for the future optical lens manufacturing runs based upon the statistical deviations.

15. The non-transitory computer-readable medium of claim 12, wherein the method further comprises:

obtaining the compensation factors to the Lab Management System for adjustment of commands provided to lens manufacturing equipment to compensate for the computed manufacturing deviations.

* * * * *